United States Patent
Hirashima (10) Patent No.: US 11,904,876 B2
(45) Date of Patent: Feb. 20, 2024

(54) VEHICLE CONTROL SYSTEM

(71) Applicant: DENSO CORPORATION, Kariya (JP)

(72) Inventor: Yuuto Hirashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 503 days.

(21) Appl. No.: 16/952,006

(22) Filed: Nov. 18, 2020

(65) Prior Publication Data

US 2021/0188295 A1    Jun. 24, 2021

(30) Foreign Application Priority Data

Dec. 18, 2019    (JP) ................. 2019-228548

(51) Int. Cl.
*B60W 50/04* (2006.01)
*B60W 30/095* (2012.01)

(52) U.S. Cl.
CPC ...... *B60W 50/045* (2013.01); *B60W 30/0953* (2013.01); *B60W 2050/046* (2013.01); *B60W 2556/30* (2020.02); *B60W 2556/55* (2020.02)

(58) Field of Classification Search
CPC ............... B60W 50/04; B60W 50/045; B60W 2050/046; B60W 2050/048; B60W 2556/55; B60W 2556/30; B60W 30/08; B60W 30/09; B60W 30/095; B60W 30/0953; B60R 25/302

See application file for complete search history.

(56) References Cited

U.S. PATENT DOCUMENTS

| | | | |
|---|---|---|---|
| 2008/0059020 A1* | 3/2008 | Sato ........... | G07C 5/085 701/33.4 |
| 2009/0118903 A1* | 5/2009 | Kimura ........ | G07C 5/008 701/36 |
| 2011/0304447 A1 | 12/2011 | Marumoto | |
| 2012/0268601 A1* | 10/2012 | Yeh ........... | H04N 7/188 348/148 |
| 2013/0107070 A1* | 5/2013 | Hsu ........... | H04N 5/772 348/220.1 |
| 2017/0309088 A1* | 10/2017 | Arya ........... | H04L 67/568 |
| 2020/0043254 A1 | 2/2020 | Hase et al. | |
| 2020/0118359 A1* | 4/2020 | Sato ............ | H04W 4/38 |

FOREIGN PATENT DOCUMENTS

JP    H10177663 A    6/1998

* cited by examiner

*Primary Examiner* — Ian Jen
*Assistant Examiner* — Renee LaRose
(74) *Attorney, Agent, or Firm* — POSZ LAW GROUP, PLC (57) ABSTRACT

In a vehicle control system, a sampling period change unit changes a sampling period such that the sampling period is made shorter, when a driving state of the vehicle becomes to have a higher possibility of accident as a result of driving control of the vehicle than when the driving state of the vehicle becomes to have a lower possibility of accident. A data storage control unit stores in an eMMC control instruction data stored in a temporary storage buffer in a non-volatile memory by sampling at the sampling period set by the sampling period change unit.

14 Claims, 8 Drawing Sheets

SAMPLING PERIOD TABLE OF STEERING INSTRUCTION VALUE

| VEHICLE OPERATION STATE | PERIOD |
|---|---|
| ROAD CURVE RADIUS R ≤ 150 m,<br>YAW ANGULAR VELOCITY ≥ \| 7 deg \|,<br>LATERAL ACCELERATION ≥ \| 0.25G \|, AND<br>ROAD WIDTH ≤ 5m | 10ms |
| OTHER THAN ABOVE | 100ms |

FIG. 3

SAMPLING PERIOD TABLE OF VEHICLE SPEED INSTRUCTION VALUE

| VEHICLE OPERATION STATE | PERIOD |
|---|---|
| DISTANCE TO FRONT VEHICLE < 40m AND<br>LONGITUDINAL ACCELERATION > 0.1G | 25ms |
| OWN VEHICLE SPEED > 40km/h<br>OWN VEHICLE STEERING ANGLE > \| 20 deg \|, AND<br>RELATIVE SPEED OF FRONT VEHICLE < \| 2km/h \| | 25ms |
| OTHER THAN ABOVE | 100ms |

| i | 0 | 1 | 2 | 3 | ... | n |
|---|---|---|---|---|---|---|
| B(i).t | 0 | 25 | 50 | 75 | ... | 25n |
| B(i).v | 5 | 6 | 7 | 8 | ... | 7 |
| B(i).samp | 25 | 25 | 25 | 100 | ... | 25 |

VEHICLE CONTROL SYSTEM

CROSS REFERENCE TO RELATED APPLICATION

The present application claims the benefit of priority from Japanese Patent Application No. 2019-228548 filed on Dec. 18, 2019. The entire disclosures of the above application are incorporated herein by reference.

FIELD

The present disclosure relates to a vehicle control system for controlling a traveling state of a vehicle.

BACKGROUND

In a conventional data collection device, vehicle traveling state data are collected and stored in an external memory slowly, that is, at a low frequency of a long period. When a collision accident occurs, for example, the vehicle traveling state data are collected and stored in the external memory quickly, that is, at a high frequency of a short period. As a result, the storage capacity of the external memory is saved, and the life of the external memory is extended by reducing the number of writings of data to the external memory.

The data collection device switches the sampling frequency for sampling the vehicle traveling state data as accident signals, which include an operation signal of an airbag or an acceleration signal output from an impact detection device installed in a vehicle, to the high frequency, when the accident signal is detected. In this way, the data collection device switches the sampling period in response to an actual occurrence of an accident.

SUMMARY

According to the present disclosure, a vehicle control system for controlling a traveling state of a vehicle comprises a storage buffer unit, a sampling period change unit and a storage control unit. The storage buffer unit is configured to sample and store, at a predetermined sampling period, control instruction data of a control target device which varies the travelling state of the vehicle. The sampling period change unit configured to change the sampling period for selecting the control instruction data stored in the storage buffer unit in accordance with a driving state of the vehicle. The storage control unit is configured to select and store in a non-volatile memory, at the sampling period set by the sampling period change unit, the control instruction data stored in the storage buffer unit.

DETAILED DESCRIPTION OF THE EMBODIMENT

First Embodiment

Hereinafter, a vehicle control system according to a first embodiment of the present disclosure will be described in detail with reference to the accompanying drawings. In the present embodiment, a vehicle control system is exemplified to execute control for autonomously driving an own vehicle as control of a traveling state of the vehicle. This autonomous driving may be executed, for example, in a limited area such as an expressway only or in any other roads including general roads.

Figure 1:
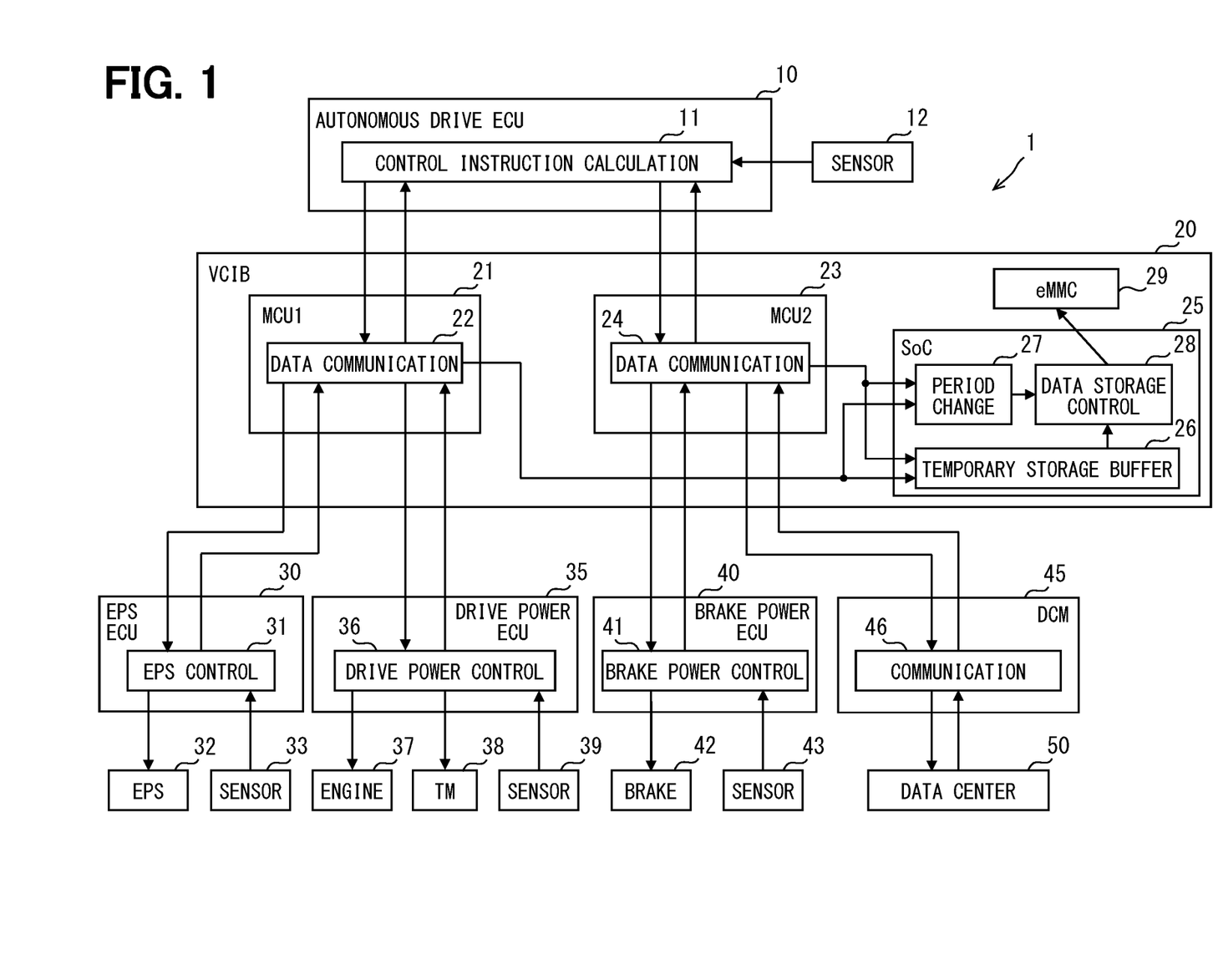
FIG. 1 is a configuration diagram showing an overall configuration of a vehicle control system according to a first embodiment.

As shown in FIG. 1, a vehicle control system 1 includes an autonomous drive ECU (electronic control unit) 10. The autonomous drive ECU 10 includes a control instruction calculation unit 11, which calculates control instruction values (control instruction data) for autonomously driving a vehicle based on detection data detected by various sensors 12, 33, 39 and 43.

The sensor 12 may be at least one of a camera, a radar, a sonar and a LIDAR (light detection and ranging). The sensor 12 outputs detection data indicating a distance and a direction to other vehicles, artificial structures, objects such as humans and animals existing in a peripheral area around an own vehicle. Further, in case a camera is used as the sensor 12, the sensor 12 also outputs detection data indicating traffic display such as lane markings and traffic signs of a road on which the vehicle travels. The sensor 12 performs detection at a predetermined period, and outputs the detection data that is a detection result to the control instruction calculation unit 11 of the autonomous drive ECU 10. For example, in case a camera is used as the sensor 12, the camera repeatedly captures a detection area (front, rear, sides, etc.) around the vehicle at a predetermined period. The sensor 12 identifies an object or a traffic display in the captured image and outputs detection data indicating an identification result to the control instruction calculation unit 11 of the autonomous drive ECU 10.

It is to be noted that FIG. 1 shows an example in which the sensor 12 directly outputs the detection data to the control instruction calculation unit 11. However, the sensor 12 may be configured to output the detection data to the autonomous drive ECU 10 via a VCIB (vehicle control interface box) 20 described later. As a result, the detection data detected by the sensor 12 may also be stored in an eMMC (embedded multi media card) 29, which is a non-volatile memory.

Other sensors 33, 39 and 43 detect driving states of the own vehicle and output respective detection data to the autonomous drive ECU 10. The detection data of the detected driving states are, for example, a travel speed of the own vehicle, longitudinal acceleration in the front-back direction, lateral acceleration in the left-right direction, steering angle of a steering wheel, yaw angular velocity, engine rotation speed, engine water temperature, and brake fluid pressure.

Although FIG. 1 illustrates one sensor 12 that outputs detection data to the autonomous drive ECU 10, and one sensor 33, 39 and 43 that outputs detection data to each ECU 30, 35 and 40, the detection data may be input from a plurality of sensors to each of the ECUs 10, 30, 35 and 40.

Furthermore, the autonomous drive ECU 10 acquires road information (road type, road width, road shape, etc.) regarding the road, on which the own vehicle travels, from an external data center 50 or a navigation device (not shown). The road width and the road shape may be calculated based on a result of identifying lane markings detected by the camera. Detection data detected by the other sensors 33, 39 and 43, road information from the data center 50 and the like are provided to the autonomous drive ECU 10 via the VCIB 20.

The control instruction calculation unit 11 calculates and outputs to each ECU 30, 35 and 40 control instruction data for controlling the driving state of the own vehicle based on input various detection data (including road information) so that the own vehicle travels in correspondence to a planned travel route. For example, the control instruction calculation unit 11 calculates and outputs a steering instruction value indicating a target steering angle as the control instruction data to an EPS (electric power steering) ECU 30 described later at a predetermined period (for example, 10 ms) so that the own vehicle travels within the lane of the road on the planned travel route based on the detected lane markings. Alternatively, in case that the road on which the own vehicle travels has multiple lanes and an obstacle such as a stopped vehicle on the traffic lane on which the own vehicle travels, the control instruction calculation unit 11 calculates and outputs to the EPSECU 31 the steering instruction value indicating the target steering angle at a predetermined period so that the own vehicle changes the present travel lane to the adjacent lane to avoid the obstacle and returns to the original lane.

In addition, the control instruction calculation unit 11 calculates and outputs to a drive power ECU 35 described later a vehicle speed instruction value indicating a target travel speed of the vehicle as the control instruction data based on a legal speed limit of a travel road, a road shape, a distance and a relative speed relative to the other vehicle traveling ahead, and the like at a predetermined period (for example, 25 ms). Furthermore, when stopping of another vehicle traveling ahead of the own vehicle, the presence of an obstacle, a stop line, a red traffic light, or the like is detected in front of the own vehicle, the control instruction calculation unit 11 calculates and outputs to a brake power ECU 40 a deceleration instruction value indicating a target deceleration, which reduces the vehicle speed to zero before reaching a stop position of the own vehicle, as the control instruction data at a predetermined period. In addition, when it is necessary to reduce the travel speed of the own vehicle, for example, when an engine braking is not sufficient and a brake 42 needs to be activated, the control instruction calculation unit 11 calculates and outputs to the brake power ECU 40 a deceleration instruction value at a predetermined period.

The EPS ECU 30 has an EPS control unit 31. The EPS control unit 31 controls driving of an electric motor of an electric power steering (EPS) 32 so that an actual steering angle of the vehicle matches a given steering instruction value. Further, the EPS control unit 31 outputs the detection data detected by the sensor 33 to the control instruction calculation unit 11 at a predetermined period. The drive power ECU 35 has a drive power control unit 36. The drive power control unit 36 controls an engine torque generated by an engine 37 and a gear shift stage of a transmission (TM) 38 so that an actual travel speed of the own vehicle matches a given vehicle speed instruction value. Further, the drive power control unit 36 outputs the detection data detected by the sensor 39 to the control instruction calculation unit 11 at a predetermined period. The brake power ECU 40 has a brake power control unit 41. The brake power control unit 41 controls the brake power to be provided by the brake 42 so that an actual deceleration of the own vehicle matches a given deceleration instruction value. Further, the brake power control unit 41 outputs the detection data detected by the sensor 43 to the control instruction calculation unit 11 at a predetermined period. The periods at which the EPS control unit 31, the drive power control unit 36 and the brake power control unit 41 output the detection data may be the same or different.

The VCIB 20 is provided between the autonomous drive ECU 10, and a group of the EPS ECU 30, drive power ECU 35 and brake power ECU 40. The VCIB samples the control instruction data and the detection data at respective sampling periods and stores such data in a temporary storage buffer 26, by routing the control instruction data output from the control instruction calculation unit 11 of the autonomous drive ECU 10 to the control units 31, 36 and 41 of the respective ECUs 30, 35 and 40 and the detection data of the sensors 33, 39 and 43 output from the respective control units 31, 36 and 41 to the control instruction calculation unit 11. It should be noted that, for at least the control instruction data, the sampling period for storing data in the temporary storage buffer 26 is preferably equal to the shortest sampling period (highest sampling frequency) in a sampling period data table described later.

Further, the VCIB 20 selects and saves in the eMMC 29 the data stored in the temporary storage buffer 26 at a sampling period set according to the driving state of the vehicle. Hereinafter, the VCIB 20 will be described in detail.

As shown in FIG. 1, the VCIB 20 includes a first microcomputer (MCU1) 21, a second microcomputer (MCU2), and an SoC (system on a chip) 25. The first microcomputer 21 is provided between the control instruction calculation unit 11 and the EPS control unit 31 and the drive power control unit 36. The second microcomputer 23 is provided between the control instruction calculation unit 11 and the brake power control unit 41 and a communication unit 46 of a DCM (data communication module) 45 described later. The SoC 25 includes the temporary storage buffer 26, a period change unit 27, a data storage control unit 28 and the eMMC 29 that is a non-volatile memory.

The first microcomputer 21 has a data communication unit 22. The data communication unit 22 receives from the control instruction calculation unit 11 the steering instruction value and the vehicle speed instruction value, which are the control instruction data output at respective predetermined periods. The data communication unit 22 outputs the received steering instruction value to the EPS control unit 31 and outputs the vehicle speed instruction value to the drive power control unit 36, thereby routing the control instruction data. Further, the data communication unit 22 outputs the steering instruction value and the vehicle speed instruction value received at predetermined periods to the temporary storage buffer 26. As a result, the temporary storage buffer 26 stores the steering instruction value and the vehicle speed instruction value output from the control instruction calculation unit 11 at the respective predetermined periods.

In addition, the data communication unit 22 receives the detection data detected by the sensor 33 and output from the EPS control unit 31 at the predetermined period, and the detection data detected by the sensor 39 and output from the drive power control unit 36 at a predetermined period. Then, the data communication unit 22 routes the detection data by outputting the received detection data to the control instruction calculation unit 11. Further, the data communication unit 22 outputs each detection data received at each period to the temporary storage buffer 26. As a result, the temporary storage buffer 26 stores each data detected by each sensor 33, 39 and provided to the control instruction calculation unit 11 at the predetermined period.

Similarly to the first microcomputer 21, the second microcomputer 23 also has a data communication unit 24. The data communication unit 24 receives from the control instruction calculation unit 11 the deceleration instruction value which is the control instruction data output at a predetermined period. The data communication unit 24 routes the control instruction data by outputting the received deceleration instruction value to the brake power control unit 41. Further, the data communication unit 24 outputs the deceleration instruction value received at a predetermined period to the temporary storage buffer 26. As a result, the temporary storage buffer 26 stores the deceleration instruction value output from the control instruction calculation unit 11 at the predetermined period.

In addition, the data communication unit 24 receives the detection data detected by the sensor 43 and output from the brake power control unit 41 at a predetermined period. The data communication unit 24 routes the detection data by outputting the received detection data to the control instruction calculation unit 11. Further, the data communication unit 24 outputs the detection data received at a predetermined period to the temporary storage buffer 26. Accordingly, the temporary storage buffer 26 stores the detection data detected by the sensor 43 and provided to the control instruction calculation unit 11 at the predetermined period.

Further, the data communication unit 24 of the second microcomputer 23 receives data (for example, road information or traffic information) transmitted from the data center 50 and received by the communication unit 46 of the DCM 45, and outputs such data to the control instruction calculation unit 11. Further, the data communication unit 24 receives data (for example, travel destination of the own vehicle and planned travel route, etc.) output from the control instruction calculation unit 11 toward the data center 50 provided externally away from the vehicle, and outputs such data to the communication unit 46 of the DCM 45. The communication unit 46 transmits the received data to the data center 50. In this way, the data communication unit 24 also routes the data exchanged between the control instruction calculation unit 11 and the data center 50. The data communication unit 24 may output the data communicated between the control instruction calculation unit 11 and the data center 50 to the temporary storage buffer 26 and store the data therein.

In the above example, the VCIB 20 has two microcomputers 21 and 23, and these two microcomputers 21 and 23 share the data, which are routed and output to the temporary storage buffer 26. However, the VCIB 20 may have only a single microcomputer and that single computer may perform routing and outputting of all the data for storing in the temporary storage buffer 26. Alternatively, the VCIB 20 may have three or more microcomputers, and the data shared by each microcomputer may be subdivided more.

The period change unit 27 receives detection data (including road information) indicating the driving state of the vehicle from the data communication units 22 and 24. The period change unit 27 has a sampling period table in which the driving state of the vehicle and the sampling period are linked with each other. The period change unit 27 refers to the sampling period table and sets the sampling period corresponding to the driving state of the vehicle as the sampling period for selecting the data to be stored in the eMMC 29 from the data stored in the temporary storage buffer 26.

Figure 2:
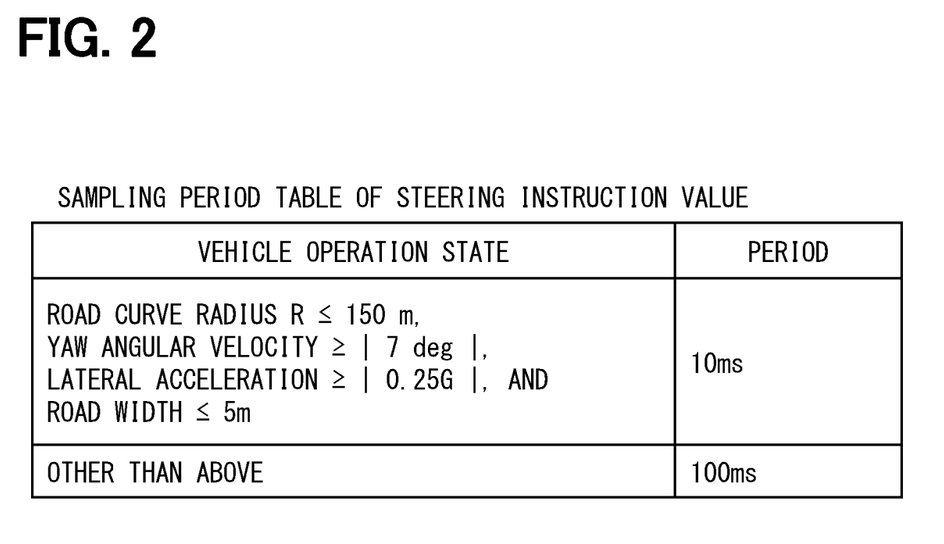
FIG. 2 is an illustration showing an example of a sampling period table of a steering instruction value.

Examples of the sampling period tables will be described with reference to FIG. 2 and FIG. 3. FIG. 2 shows an example of a sampling period table of the steering instruction values, and FIG. 3 shows an example of a sampling period table of the vehicle speed instruction values.

According to the example of the sampling period table shown in FIG. 2, the steering instruction value sampling period is set to 10 ms as a short sampling period in case that the driving state of the own vehicle is traveling on a road having a radius of curvature of 150 m or less, a magnitude of a yaw angular velocity is 7 deg/s or more in absolute value, a magnitude of a lateral acceleration is 0.25 G or more in absolute value and a width of a road on which a vehicle travels is 5 m or less, that is, when the own vehicle is quickly turning on a road with a relatively narrow width and a small radius of curvature. This driving state corresponds to a driving state having a high possibility of an accident. On the other hand, when the driving state of the own vehicle is any other state, the sampling period of the steering instruction value is set to 100 ms as a long the sampling period.

Figure 3:
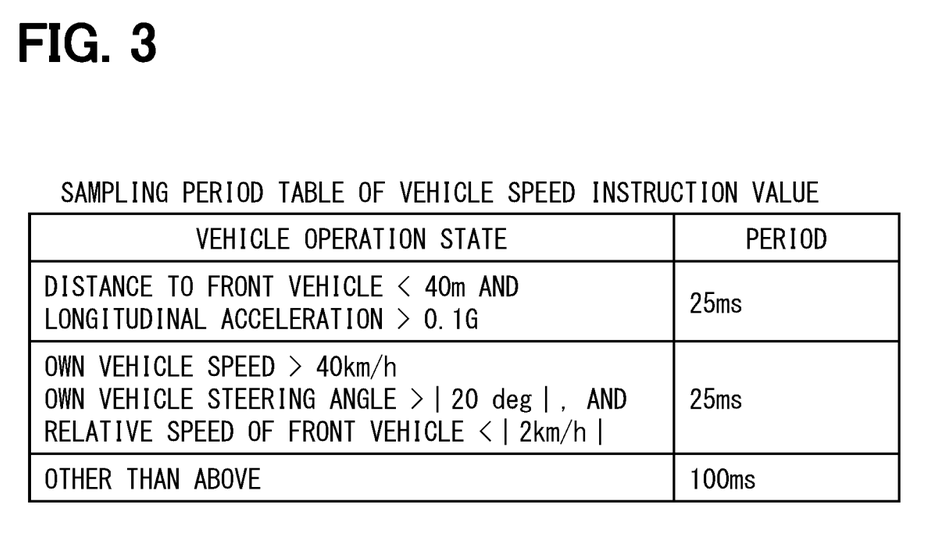
FIG. 3 is an illustration showing an example of a sampling period table of a vehicle speed instruction value.

Further, according to the example of the sampling period table shown in FIG. 3, the sampling period of the vehicle speed instruction value is set to 25 ms, in case that the driving state of the own vehicle is such that a distance to a preceding vehicle traveling in front of the own vehicle is less than 40 m and a magnitude of a longitudinal acceleration is 0.1 G or more. In addition, the sampling period of the vehicle speed instruction value is set to 25 ms, in case that the driving state of the own vehicle is such that the travel speed of the own vehicle is higher than 40 km/h, the absolute value of the steering angle of the own vehicle is larger than 20 deg, and the absolute value of the relative speed with respect to the preceding vehicle is less than 2 km/h. On the other hand, in case that the driving state of the own vehicle is any other state, the sampling period of the vehicle speed instruction value is set to 100 ms.

In this way, when the vehicle driving state becomes highly likely that the vehicle will possibly be involved in an accident because of the control in the vehicle control system (that is, control of the EPS 32, the engine 37, the transmission 38, the brake 42, etc.) based on the control instruction data output from the control instruction calculation unit 11, the sampling period is changed to a short period, which is shorter than that of the normal sampling period of the driving state in which the vehicle is not likely to be involved in an accident. It is to be noted that the driving states for which the sampling period is set to be short as shown in FIG. 2 and FIG. 3 are merely exemplary, and other driving states may be adopted as the driving state of the own vehicle corresponding to the short sampling period.

The data storage control unit 28 samples the data stored in the temporary storage buffer 26 and stores the sampled data in the eMMC 29 in accordance with the sampling period set by the period change unit 27. That is, according to the present embodiment, the sampling period for selecting the data to be stored in the eMMC 29 (non-volatile memory) from the data stored in the temporary storage buffer 26 is not changed in response to the actual occurrence of an accident. It is rather changed to the shorter sampling period at the earlier time when the possibility of accident increases because of the control by the vehicle control system 1. Therefore, while maintaining the life of the eMMC 29 by reducing the number of times of writing data thereto, data that are used when the control that may cause an accident is performed by the vehicle control system 1 are surely stored in the eMMC 29.

In the above example, the period change unit 27 individually has the sampling period table in which the driving state of the vehicle and the sampling period are linked with each other for each of the plurality of types of control instruction data. Further, the period change unit 27 sets the short sampling period only for the control instruction data in which the driving state of the vehicle is in the driving state linked with the short sampling period.

However, when the driving state of the vehicle changes to a driving state which is linked to the short sampling period in regard to at least one of a plurality of types of control instruction data, the period change unit 27 may set the short sampling period for the control instruction data (including detection data) other than the control instruction data of the same driving state. As a result, since the eMMC 29 stores various data sampled at the short sampling period at any occurrence of accident, it is possible to analyze the cause of the accident in detail.

Further, the period change unit 27 may set the short sampling period of the plurality of types of data individually as the sampling period table in place of setting the short sampling period commonly for the plurality of types of control instruction data.

Regarding the detection data stored in the temporary storage buffer 26, the sampling data table linking the driving state of the vehicle with the sampling period for setting the sampling period of selecting the detection data to be stored in the eMMC 29 may be provided individually for each detection data or commonly for all the detection data in the same manner as the control instruction data. Alternatively, the data storage control unit 28 may select the detection data that is the basis for generating the control instruction data from the temporary storage buffer 26 at the same sampling period and store the selected data in the eMMC 26.

The VCIB 20 is configured to execute various processing including selecting each data of the control instruction data and the detection data stored in the temporary storage buffer 26 at the sampling period corresponding to the driving state of the vehicle and storing the selected data in the eMMC 29. These processing will be described with reference to flowcharts shown in FIG. 4, FIG. 5 and FIG. 7, a table shown in FIG. 6 and a timing chart shown in of FIG. 8. The following processing may be executed by at least one microcomputer of the VCIB 20.

Figure 4:
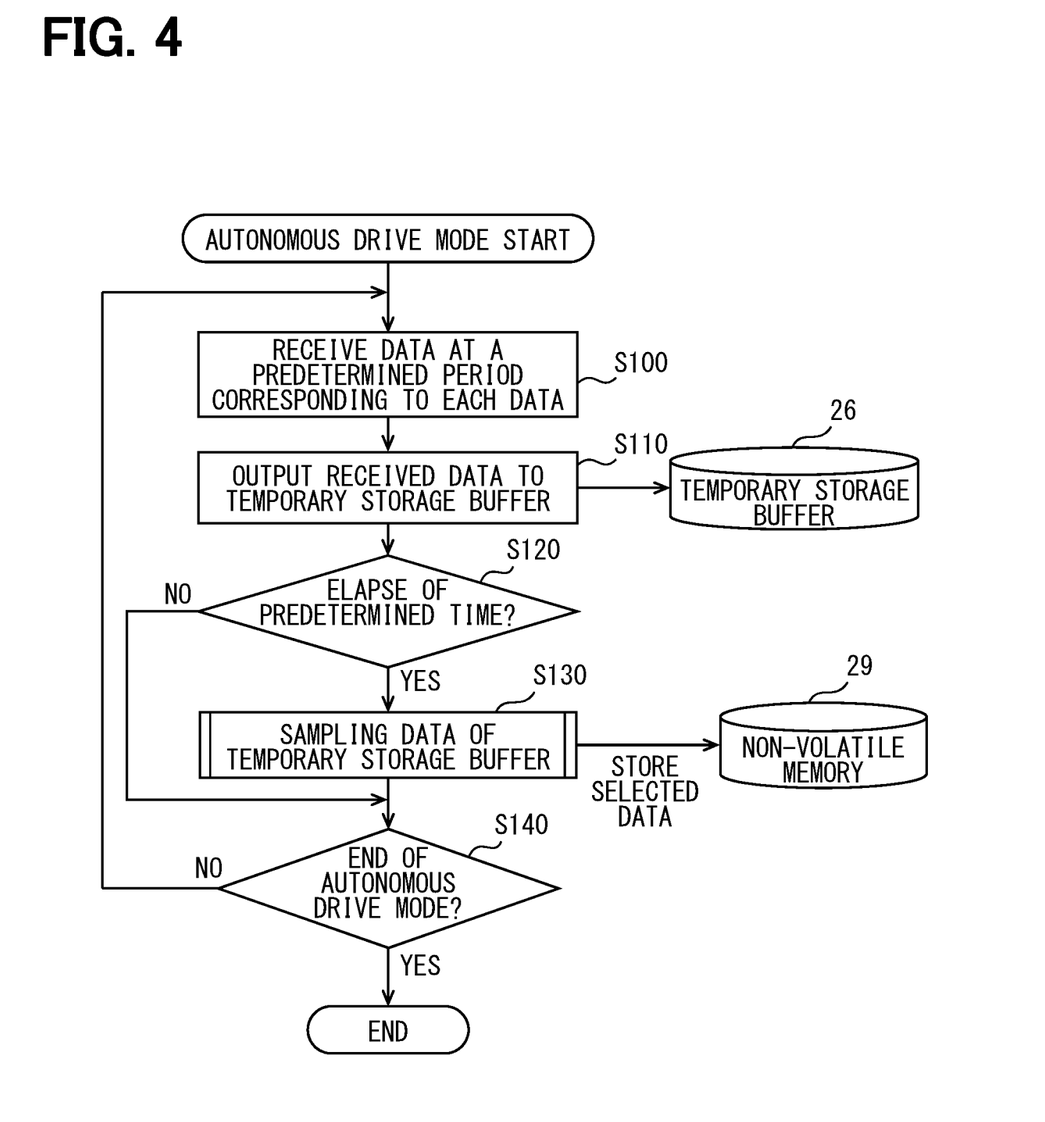
FIG. 4 is a flowchart showing processing executed in a VCIB when an autonomous driving mode is started.

FIG. 4 is a flowchart showing processing executed in the VCIB 20 when the autonomous driving mode is started. In a first step S100 of FIG. 4, the data communication units 22 and 24 of the first and second microcomputers 21 and 23 of the VCIB 20 receive each data at the period predetermined in correspondence to each data. Then, in step S110, the data communication units 22 and 24 output the received data to the temporary storage buffer 26. Thus, each data is stored in the temporary storage buffer 26.

In step S120, it is checked whether a predetermined time has elapsed after the previous processing of storing data in the eMMC 29. When it is determined that the predetermined time has elapsed in this checking, sampling processing is executed to sample each data stored in the temporary storage buffer 26 in order to select the data to be stored in the eMMC 29 from each data stored in the temporary storage buffer 26 in step S130 and store the sampled data in the eMMC 29. On the other hand, when it is determined that the predetermined time has not elapsed yet, step S140 is executed by skipping the sampling process of step S130. That is, in the present embodiment, the sampling process of step S130 is performed at the timing when the data for the predetermined time is accumulated in the temporary storage buffer 26. In step S140, it is checked whether the autonomous driving mode has ended. When it is determined that the autonomous driving mode has ended, the processing shown in the flowchart of FIG. 4 is finished. On the other hand, when it is determined that the autonomous driving mode has not ended, the above processing is repeated from step S100.

Figure 5:
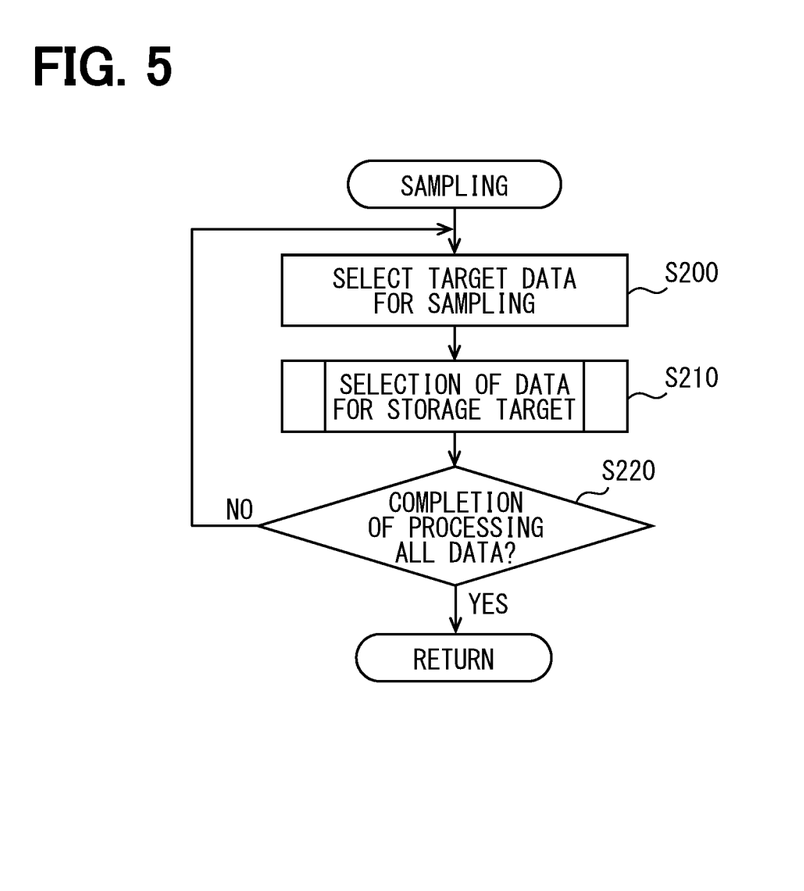
FIG. 5 is a flowchart showing details of the sampling processing in step S130 of the flowchart of FIG. 4.

Details of the sampling process in step S130 are shown in the flowchart of FIG. 5. On the other hand, when the driving state of the own vehicle is any other state, the sampling period of the steering instruction value is set to 100 ms Hereinafter, the sampling process of each data stored in the temporary storage buffer 26 will be described with reference to the flowchart of FIG. 5. In first step S200 of FIG. 5, target data to be sampled is selected from a plurality of types of data.

In following step S210, with respect to the data selected as the sampling target, the data to be stored in the eMMC 29 is selected from the plurality of data stored in the temporary storage buffer 26 in accordance with the sampling period set by the period change unit 27. The process of selecting the data to be stored in the eMMC 29 will be described later in detail.

In step S220, it is checked whether all types of data are selected as the target data of the sampling process, and the selection process of the data to be stored in the eMMC 29 is completed for all types of data. When it is determined in step S220 that the selection process of the data to be stored in the eMMC 29 has not been completed for all types of data, the above processing is repeated from step S200 to select other data, which has not been processed yet as the target data. On the other hand, when it is determined that the selection process of the data to be stored in the eMMC 29 has been completed for all types of data, the processing illustrated in the flowchart of FIG. 5 is finished. After step S220, step S140 of the flowchart of FIG. 4 is executed.

Hereinafter, an example of the data selection processing in step S210 of FIG. 5 will be described in detail with reference to the table of FIG. 6 and the flowchart of FIG. 7.

Figure 6:
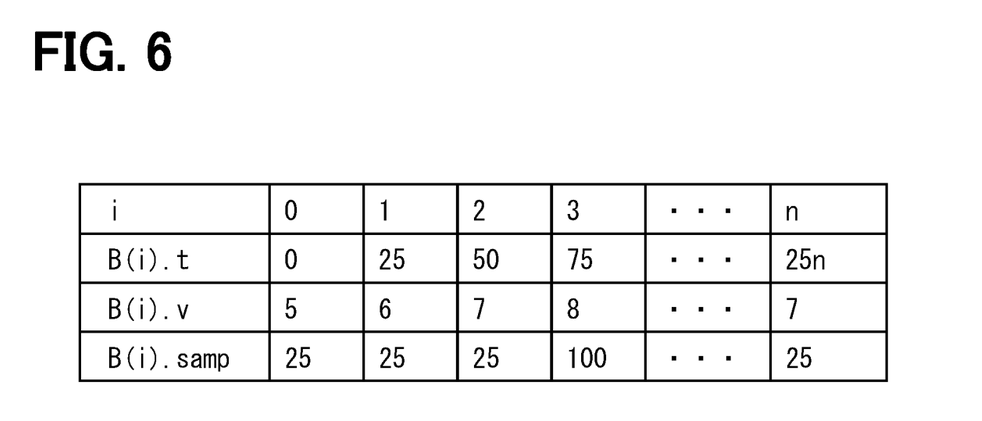
FIG. 6 is an illustration showing a table used in selection processing of selecting data to be stored in an eMMC in step S210 of the flowchart of FIG. 5.

In FIG. 6, B(i).t indicates a time when each data communication unit 22, 24 has received data B(i), and B(i).v indicates a value of the data B(i). As shown in the table of FIG. 6, the temporary storage buffer 26 stores the time B(i).t when the data B(i) is received and the value of the data B(i) in the linked manner with each other. Further, in FIG. 6, B(i).samp is a sampling period, which is set by referring to a sampling period table and variable with the driving state of the own vehicle at the time when each data B(i) is received. This sampling period B(i).samp may be set by the period change unit 27 when each data is stored in the temporary storage buffer 26, and may be stored in the temporary storage buffer 26 together with the data reception time and the data value. Alternatively, it may be set by the period change unit 27 when selecting the data to be stored in the eMMC 29 from the data stored in the temporary storage buffer 26.

Figure 7:
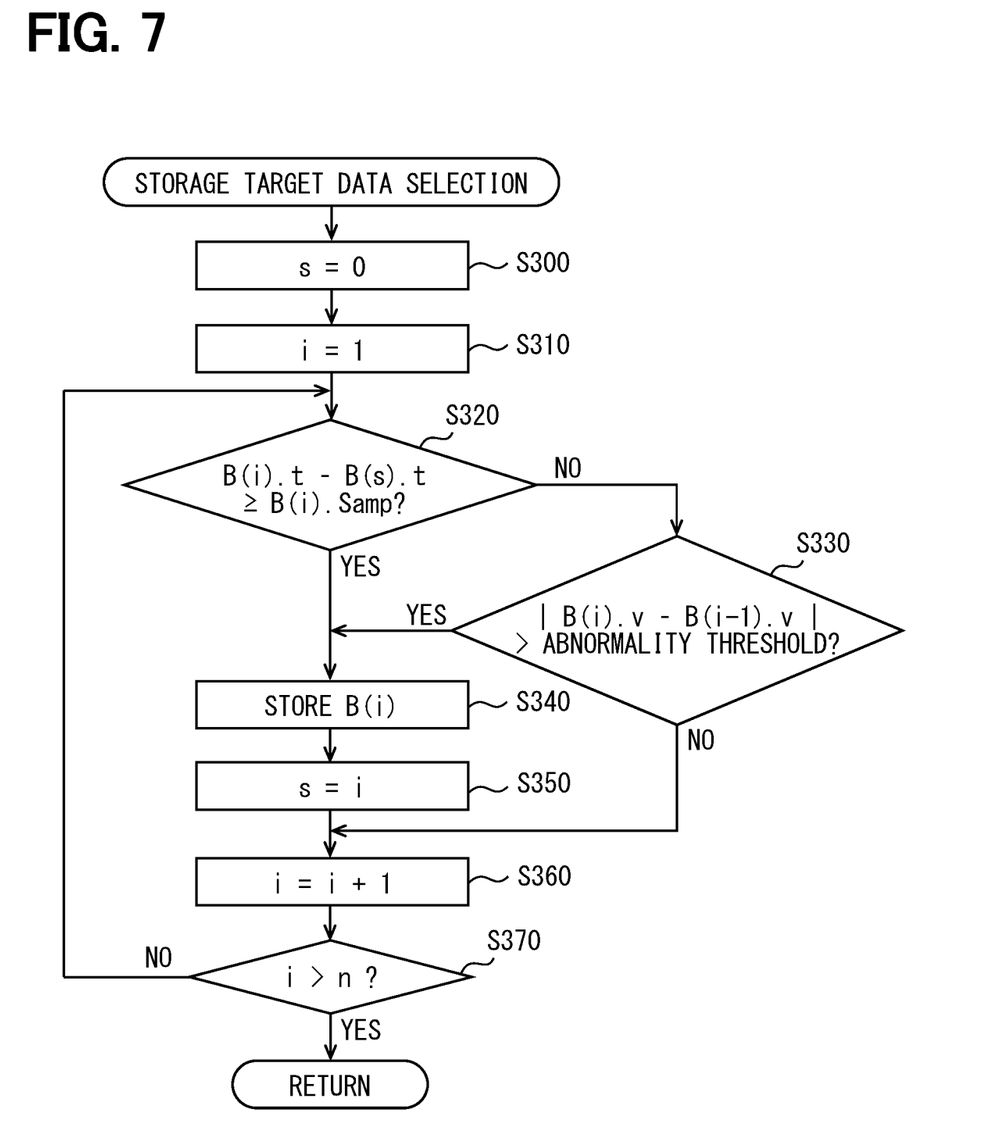
FIG. 7 is a flowchart showing details of selection processing of selecting data to be stored in the eMMC 29 in step S210 of the flowchart of FIG. 5.

In first step S300 of the flowchart of FIG. 7, a variable "s" indicating the data having been stored in the eMMC 29 is set to 0. At this time, the first data B(0) which corresponds to the variable s=0 may be selected as the target data for storage in the eMMC 29 and then stored in the eMMC 29. In following step S310, a variable "i" indicating whether it is a target data to be checked for storage is set to 1.

Then, in step S320, it is checked whether a time difference between the reception time B(i).t of the check target data B(i) and the reception time B(s).t of the data B(s) stored in the eMMC 29 is equal to or larger than the sampling period B(i).samp, which is set according to the driving state of the own vehicle at the time of receiving the check target data B(i). When the time difference B(i).t−B(s).t is equal to or larger than the sampling period B(i).samp, the reception time B(i).t of the check target data B(i) is later than the reception time B(s).t of the data B(s) stored in the eMMC 29 at the previous time by the sampling period B(i).samp or larger. In this case, the check target data B(i) is selected as the storage target data and stored in the eMMC 29 in step S340. On the other hand, when it is determined in step S320 that the time difference B(i).t−B(s).t is smaller than the sampling period B(i).samp, step S330 is executed.

In step S330, it is checked whether an absolute value of a difference between the data value B(i).v of the check target data B(i) and a data value B(i−1).v of the immediately preceding data B(i−1) is larger than a predetermined abnormality determination threshold value. The abnormality determination threshold value is set to a value capable of checking a magnitude that does not normally occur as a change in data. When it is determined in this check process that the absolute value of the difference between the two data |B(i).v−B(i−1).v| is larger than the abnormality determination threshold value, the check target data B(i) is selected as the storage target data and stored in the eMMC 29 in step S340. That is, in the present embodiment, when the difference between the two data stored presently and preciously in the temporary storage buffer 26 is larger than the predetermined abnormality determination threshold value continuously in time, the check target data B(i) is selected as the storage target data and stored in the eMMC 29 regardless of the sampling period set by the period changing unit 27. This can prevent the abnormal data from being excluded from the data to be stored in the eMMC 29. On the other hand, when it is determined in step S330 that the absolute value | B(i).v−B(i−1).v| of the difference between the two data is equal to or smaller than the abnormality determination threshold value, step S360 is executed.

In step S350, since the data B(i) has been stored in the eMMC 29 in step S340, the variable "s" indicating the data stored in the eMMC 29 is rewritten to s=i. In step S360, the variable "i" is incremented so that the check target data is updated. In next step S370, it is checked whether the variable "i" indicating the check target data has become larger than the number "n" of data stored in the temporary storage buffer 26 within a fixed time. When it is determined in this check process that the variable "i" is larger than the data number "n," the storage data selection processing shown in the flowchart of FIG. 7 is finished and the processing of the flowchart shown in FIG. 5 is executed. On the other hand, when it is determined in step S370 that the variable "i" is equal to or smaller than the number of data "n,", the process returns to step S320.

Figure 8:
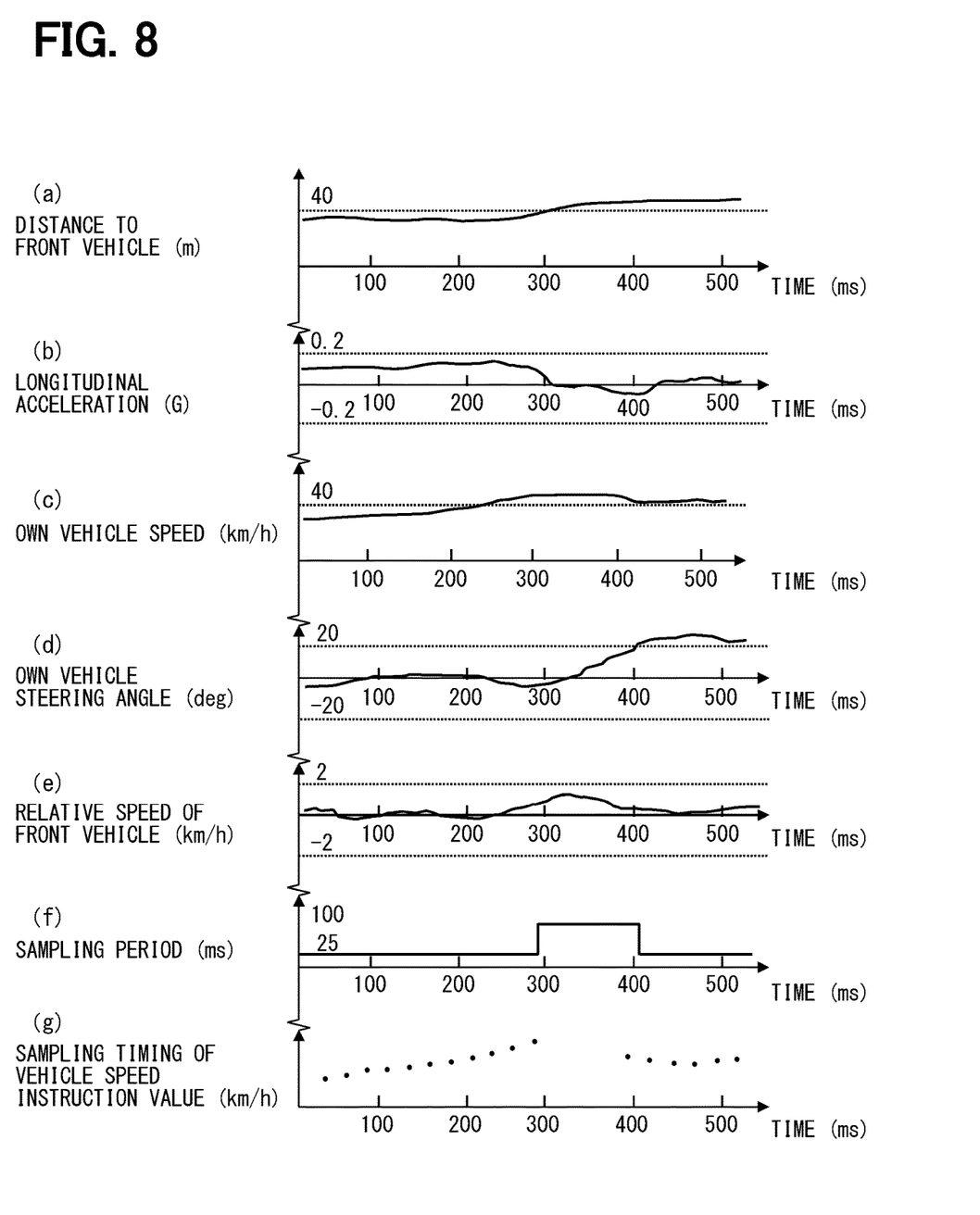
FIG. 8 is a timing chart showing one example of changes in a sampling period for selecting a vehicle speed instruction value to be stored in the eMMC from among vehicle speed instruction values stored in a temporary storage buffer when the vehicle speed instruction value is a target data of the sampling processing.

FIG. 8 is a timing chart of one example showing changes of the sampling period, which is for selecting the vehicle speed instruction value to be stored in the eMMC 20 from the vehicle speed instruction value stored in the temporary storage buffer 26, in correspondence to the driving state of the own vehicle, when the vehicle speed instruction value becomes the target data of the sampling processing in step S200 in the flowchart of FIG. 5.

In the timing chart of FIG. 8, until elapsed time on the horizontal axis reaches approximately 300 ms, the driving state of the own vehicle is such that the first distance between the own vehicle and the preceding vehicle in the sampling period table of FIG. 3 is shorter than 40 m as shown in (a) and the longitudinal acceleration of the own vehicle is larger than 0.1 G as shown in (b). This driving state corresponds to the first state, which is set as a state having higher possibility of an accident in the sampling period table of FIG. 3. Therefore, as shown in (f), the sampling period is set to 25 ms as a short sampling period until the elapsed time on the horizontal axis reaches about 300 ms. As a result, the sampling timing of the vehicle speed instruction value arrives every time 25 ms elapses until the elapsed time reaches approximately 300 ms, and the vehicle speed instruction value corresponding to this sampling timing is selected and stored in the eMMC 29.

When the distance to the preceding vehicle exceeds 40 m immediately before the elapsed time reaches 300 ms as shown in (a) of FIG. 8, the driving state of the own vehicle does not correspond to the driving state in the sampling period table of FIG. 3. Therefore, as shown in (f), the sampling period of the vehicle speed instruction value is changed to 100 ms set as a long sampling period.

After that, when the elapsed time reaches about 400 ms, the driving state of the own vehicle is such that the speed of the own vehicle is higher than 40 km/h as shown in (c), the steering angle is larger than 20 deg as shown in (d) and the relative speed with respect to the preceding vehicle is within 2 km/h as shown in (e). This driving state corresponds to the second driving state, which is set as a state having higher possibility of an accident in the sampling period table of FIG. 3. Therefore, as shown in (f), the sampling period of the vehicle speed instruction value is returned to 25 ms again immediately after the elapsed time exceeds 400 ms.

Second Embodiment

Figure 9:
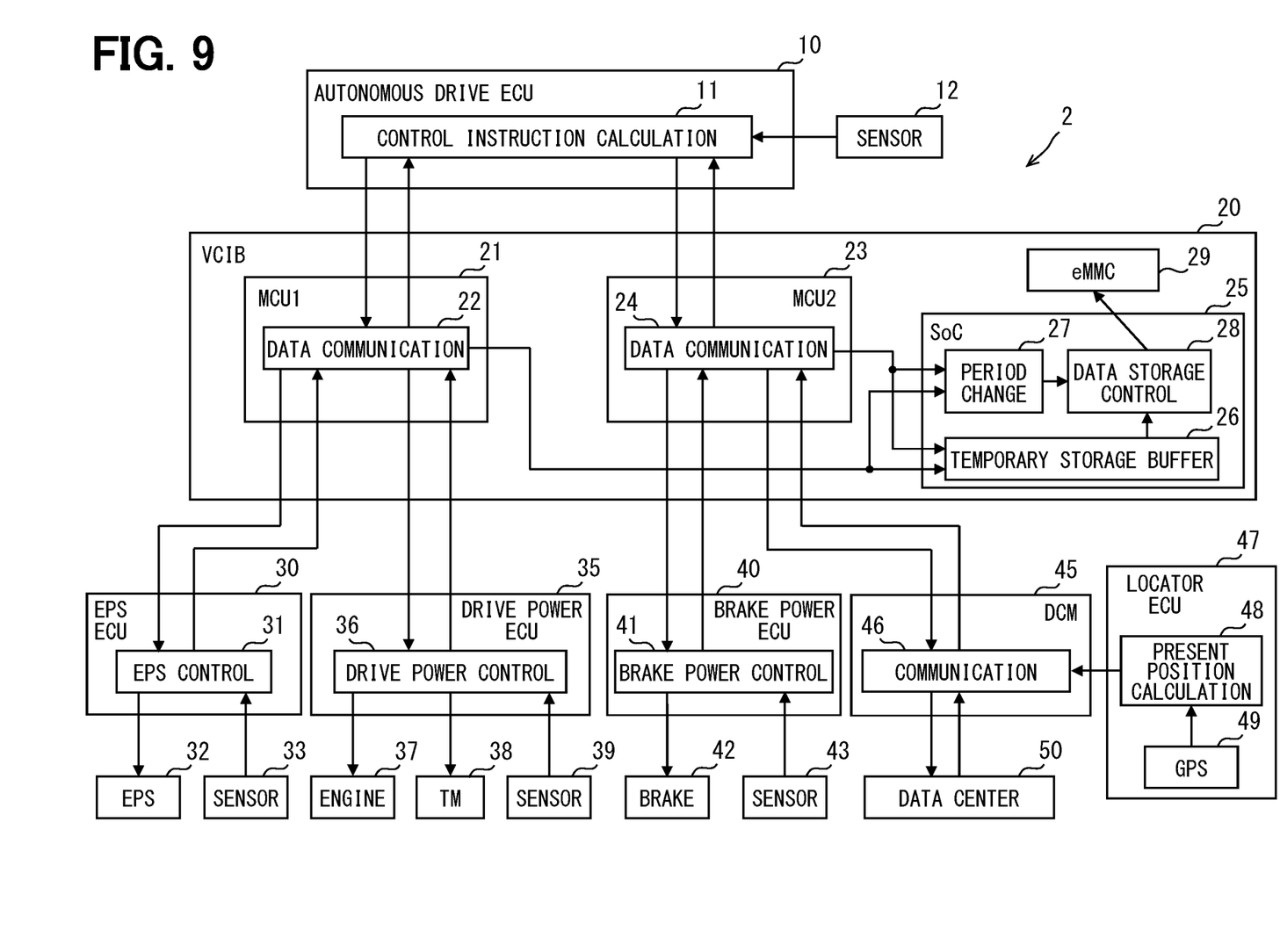
FIG. 9 is a configuration diagram showing an overall configuration of a vehicle control system according to a second embodiment.

Next, a vehicle control system according to the second embodiment of the present disclosure will be described. FIG. 9 is an overall configuration diagram of a vehicle control system 2 of the present embodiment.

As shown in FIG. 9, the vehicle control system 2 has a locator ECU 47 added to the vehicle control system 1 according to the first embodiment. Other configurations are the same as the first embodiment.

The locator ECU 47 includes a present position calculation unit 48 and a GPS receiver 49. The GPS receiver 49 receives signals transmitted from a plurality of GPS satellites. The present position calculation unit 48 calculates a present position of the own vehicle based on the signals from the plurality of GPS satellites received by the GPS receiver 49. Then, the present position of the own vehicle calculated by the present position calculation unit 48 is transmitted to a data center 50 via the communication unit 46 of the DCM 45.

The data center 50 identifies an area (region or road type) in which the vehicle is traveling based on the present position transmitted from the vehicle. The data center 50 has a sampling period table which is adapted to characteristics of each area. The data center 50 selects the sampling period table corresponding to the specified area and transmits it as update data to the vehicle.

For example, in case there is an area where an accident rate of a vehicle traveling at the vehicle speed higher than a specified value is high, the sampling period table is set to have stricter restrictions on the conditions related to the vehicle speed. In case there is an area where an accident rate on a curved road is high, the sampling period table is set to have stricter restrictions on the yaw angular speed and the lateral acceleration, which indicate a sharp turn. As a result, it becomes possible to use a sampling period table which reflects a statistical accident rate. In case an expressway is specified as a traveling area of a vehicle, for example, a sampling period table may be set so that an inter-vehicle distance from the preceding vehicle and the vehicle speed of the own vehicle are adapted to the traveling on the expressway.

It is also possible to configure the period change unit 27 to have the sampling period tables for various areas in advance, and select a sampling period table which corresponds to a new area when the traveling area of the own vehicle changes to the new area.

Figure 10:
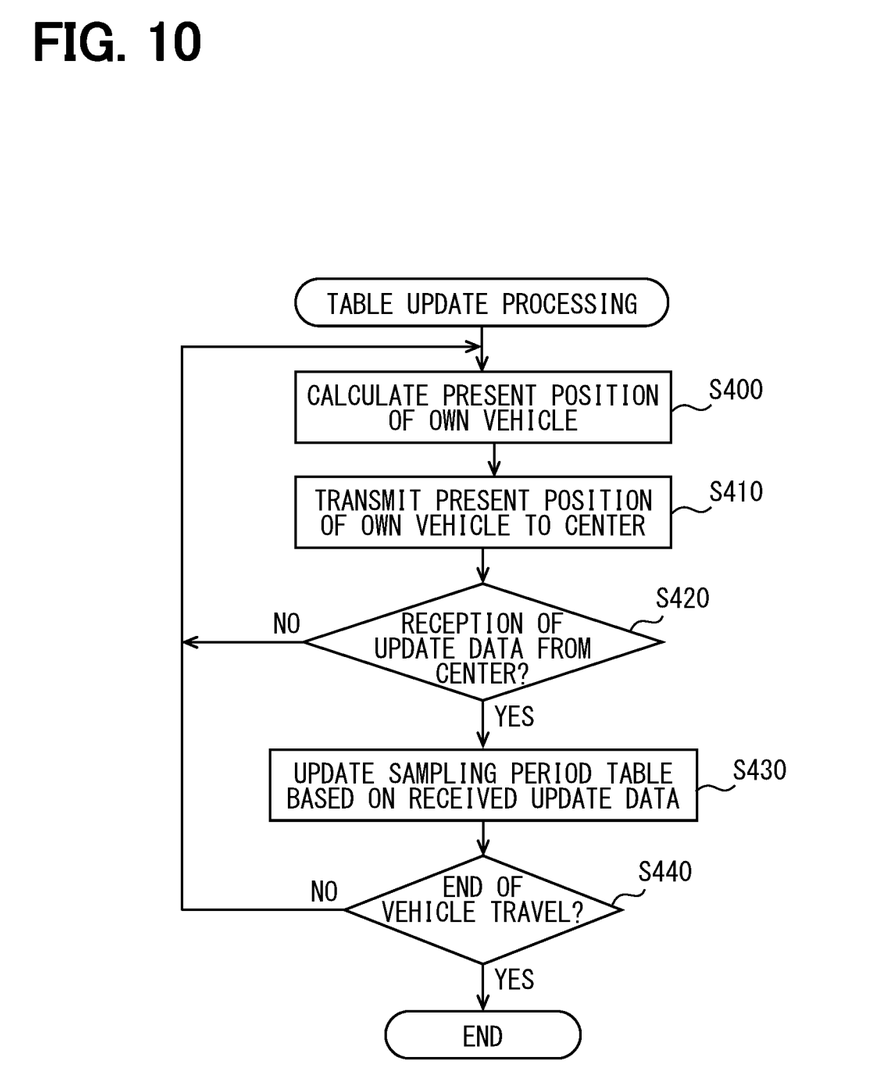
FIG. 10 is a flowchart showing an example of a sampling period table update processing in a second embodiment.

FIG. 10 is a flowchart showing an example of sampling period table update processing in the present embodiment. In first step S400, the present position of the own vehicle is calculated based on the signals received by the GPS receiver 49 from the plurality of GPS satellites. In next step S410, the calculated present position of the own vehicle is transmitted to the data center 50 via the communication unit 46 of the DCM 45.

In step S420, it is checked whether update data of the sampling period table has been received from the data center 50. When it is determined that the update data of the sampling period table has been received, step S430 is executed. In step S430, the sampling period table is updated with the received update data. Then, in step S440, It is checked whether the vehicle has finished traveling. When it is determined in this check process that the vehicle has finished traveling, the processing shown in the flowchart of FIG. 10 is terminated. On the other hand, when it is determined that the own vehicle has not finished traveling yet, the above processing is executed from S400 again.

In the vehicle control system 2 according to the present embodiment, the sampling period of data such as control instruction data is set by referring to the sampling period table regardless of the type of data. Therefore, the sampling period of each data can be flexibly changed by changing the sampling period table.

The vehicle control system according to the present disclosure described above is not limited to the above embodiments and may be variously modified within the spirit and scope of the disclosure.

For example, in the first and second embodiments, the vehicle control systems 1 and 2 are assumed to have configurations for driving the vehicle autonomously. However, the vehicle control system is not necessarily limited to a system that performs autonomous driving, and may be, for example, a system that performs cruise control in which the vehicle is controlled simply to travel at a constant speed or to follow the preceding vehicle.

What is claimed is:

1. A vehicle control system for controlling a traveling state of a vehicle, the vehicle control system comprising:
   at least one microcomputer;
   a storage buffer; and
   a non-volatile memory,
   the at least one microcomputer is configured to
      sample and store in the storage buffer, at a predetermined sampling period, control instruction data that instructs a control target to vary the travelling state of the vehicle;
      change a sampling period for selecting the control instruction data stored in the storage buffer in accordance with a driving state of the vehicle such that the sampling period is set to a predetermined short sampling period, when the driving state of the vehicle becomes to have a predetermined high possibility of accident as a result of driving control of the vehicle when the driving state of the vehicle is other than the driving state of the predetermined high possibility of accident; and
      select and store in the non-volatile memory, at the sampling period which is set, the control instruction data stored in the storage buffer,
   wherein:
   the at least one microcomputer includes a sampling period table which links the driving state of the vehicle and the sampling period, and changes the sampling period in correspondence to the driving state of the vehicle by referring to the sampling period table and setting the sampling period corresponding to the driving state of the vehicle;
   the storage buffer stores a plurality of types of control instruction data; and
   the sampling period table links the driving state of the vehicle and the sampling period for each of the plurality of types of control instruction data.

2. The vehicle control system according to claim 1, wherein:
   the sampling period table is updated based on an area where the vehicle travels.

3. The vehicle control system according to claim 1, wherein:
   the sampling period table is supplied from an external data center.

4. The vehicle control system according to claim 1, wherein:
   the at least one microcomputer sets the predetermined short sampling period for only the control instruction data corresponding to the driving state, to which the predetermined short sampling period is linked by the sampling period table.

5. The vehicle control system according to claim 1, wherein:
   the at least one microprocessor sets the predetermined short sampling period, for the control instruction data corresponding to the driving state which is linked by the sampling period table to the predetermined short sampling period, and for control instruction data corresponding to at least one other of the plurality of types of the control instruction data.

6. The vehicle control system according to claim 1, wherein:
   the storage buffer stores a plurality of types of control instruction data; and
   the sampling period table sets, for the plurality of types of control instruction data, the driving state of the vehicle linked to the predetermined short sampling period commonly and the predetermined short sampling period of the plurality of types of control instruction data individually.

7. The vehicle control system according to claim 1, wherein:
the at least one microcomputer selects the control instruction data as data to be stored in the non-volatile memory regardless of the sampling period which is set, when a difference between two data stored in the storage buffer successively is larger than a predetermined abnormality determination threshold value.

8. The vehicle control system according to claim 1, wherein:
the at least one microcomputer is further configured to
sample and store in the storage buffer, at a predetermined period, detection data which is detected by a sensor as base data for generating the control instruction data; and
select and store in the non-volatile memory at a same sampling period as that of the control instruction data, the detection data stored in the storage buffer.

9. The vehicle control system according to claim 8, wherein:
the at least one microcomputer is provided between (a) a vehicle control unit configured to generate the control instruction data and (b) at least one selected from a group of the control target and the sensor, and
the at least one microcomputer is configured to perform sampling by routing the control instruction data output from the vehicle control unit to the control target and the detection data which is output from the sensor to the vehicle control unit.

10. The vehicle control system according to claim 1, wherein:
the vehicle control system is configured to perform autonomous driving of the vehicle.

11. A vehicle control system for controlling a state of a vehicle, the vehicle control system comprising:
sensors;
a control target;
an ECU configured to calculate control instruction data for the control target, which varies the state of the vehicle, in accordance with detection data output from the sensors; and
a vehicle control interface box including a temporary storage buffer, a non-volatile memory and a microcomputer, wherein the microcomputer is configured to execute processing of:
sampling and storing, in the temporary storage buffer, at a predetermined sampling period, the control instruction data that instructs the control target to vary the state of the vehicle;
checking whether the state of the vehicle has a predetermined high possibility of accident as a result of driving control of the vehicle by the control target when the state of the vehicle is other than the state of the predetermined high possibility of accident;
setting a sampling period for selecting the control instruction data stored in the temporary storage buffer in accordance with the state of the vehicle such that the sampling period is changed to a predetermined short sampling period when the state of the vehicle is determined to have the predetermined high possibility of accident; and
selecting and storing in the non-volatile memory, at the sampling period set in processing of setting the sampling period, the control instruction data stored in the temporary storage buffer,
wherein:
the vehicle interface box further includes a sampling period table which links the state of the vehicle and the sampling period; and the microcomputer changes the sampling period in correspondence to the state of the vehicle by referring to the sampling period table and setting the sampling period corresponding to the state of the vehicle;
the temporary storage buffer stores a plurality of types of control instruction data; and
the sampling period table links the driving state of the vehicle and the sampling period for each of the plurality of types of control instruction data.

12. The vehicle control system according to claim 11, wherein:
the sampling period table is updated based on an area where the vehicle travels.

13. The vehicle control system according to claim 1, wherein the control instruction data includes at least one of: a steering instruction value indicative of a target steering angle; a vehicle speed instruction value indicative of a target travel speed of the vehicle; and a deceleration instruction value indicative of a target deceleration, which reduces a vehicle speed to zero before reaching a stop position of the vehicle.

14. The vehicle control system according to claim 11, wherein the control instruction data includes at least one of: a steering instruction value indicative of a target steering angle; a vehicle speed instruction value indicative of a target travel speed of the vehicle; and a deceleration instruction value indicative of a target deceleration, which reduces a vehicle speed to zero before reaching a stop position of the vehicle.

* * * * *